US007535717B2

(12) United States Patent
Lai et al.

(10) Patent No.: US 7,535,717 B2
(45) Date of Patent: May 19, 2009

(54) FIXTURE FOR TESTING MID-PLANE OF BLADE SERVER

(75) Inventors: Hsiu-Chang Lai, Tu-Cheng (TW); Hung-Yi Wu, Tu-Cheng (TW); Ke Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 296 days.

(21) Appl. No.: 11/390,232

(22) Filed: Mar. 27, 2006

(65) Prior Publication Data
US 2007/0053155 A1     Mar. 8, 2007

(30) Foreign Application Priority Data
Sep. 5, 2005     (CN)     ......... 2005 1 0037135

(51) Int. Cl.
*H05K 7/16* (2006.01)
(52) U.S. Cl. ................ 361/727
(58) Field of Classification Search ......... 361/607, 361/608, 609, 725, 726, 727, 685; 312/215, 312/222, 294, 307, 309, 334.2; 324/158.1
See application file for complete search history.

(56) References Cited

U.S. PATENT DOCUMENTS

| | | | | |
|---|---|---|---|---|
| 2,514,246 | A * | 7/1950 | Knox | 361/727 |
| 4,236,190 | A * | 11/1980 | Hollingsead et al. | 361/725 |
| 4,501,460 | A * | 2/1985 | Sisler | 361/730 |
| 4,601,445 | A * | 7/1986 | Duclos et al. | 361/725 |
| 4,718,858 | A * | 1/1988 | Godfrey et al. | 361/732 |
| 4,744,001 | A * | 5/1988 | Krafft et al. | 361/608 |
| 5,010,426 | A * | 4/1991 | Krenz | 361/726 |
| 5,077,722 | A * | 12/1991 | Geist et al. | 361/685 |
| 5,379,184 | A * | 1/1995 | Barraza et al. | 361/726 |
| 5,588,728 | A * | 12/1996 | Eldridge et al. | 312/332.1 |
| 5,641,296 | A * | 6/1997 | Larabell et al. | 439/342 |
| 6,025,989 | A * | 2/2000 | Ayd et al. | 361/608 |
| 6,137,684 | A * | 10/2000 | Ayd et al. | 361/727 |
| 6,257,917 | B1 * | 7/2001 | Hyzin | 439/358 |
| 6,374,460 | B1 * | 4/2002 | Edevold et al. | 361/725 |
| 6,665,179 | B2 | 12/2003 | Chou | 361/681 |
| 7,027,309 | B2 * | 4/2006 | Franz et al. | 361/732 |
| 7,042,720 | B1 * | 5/2006 | Konshak et al. | 361/685 |
| 7,042,732 | B2 * | 5/2006 | Hung | 361/727 |
| 7,079,381 | B2 * | 7/2006 | Brehm et al. | 361/685 |

(Continued)

FOREIGN PATENT DOCUMENTS

EP     157074 A1 *     10/1985

(Continued)

*Primary Examiner*—Jayprakash N Gandhi
*Assistant Examiner*—Adrian S Wilson

(57) ABSTRACT

A fixture for testing a mid-plane of a blade server includes a base board, a fixture unit and a carrier enclosure. The fixture unit is fixed on the base board, the fixture unit includes a receiving location for mounting the mid-plane thereon. The carrier enclosure is slideably attached on the base board and docked with the mid-plane. The fixture for testing a mid-plane of a blade server uses two separated modules to assist to test the mid-plane, there is no need to remove all modules from the blade server, whereupon simplifies the attachment and removing mid-plane procedure.

14 Claims, 4 Drawing Sheets

U.S. PATENT DOCUMENTS

| | | | |
|---|---|---|---|
| 7,193,847 B2 * | 3/2007 | Liang et al. | 361/690 |
| 7,210,751 B2 * | 5/2007 | Nakayama | 361/727 |
| 2002/0181194 A1 * | 12/2002 | Ho et al. | 361/724 |
| 2005/0146855 A1 | 7/2005 | Brehm et al. | |
| 2005/0174743 A1 * | 8/2005 | Downing et al. | 361/725 |

FOREIGN PATENT DOCUMENTS

| | | | |
|---|---|---|---|
| GB | 2141586 A | * | 12/1984 |

* cited by examiner

FIXTURE FOR TESTING MID-PLANE OF BLADE SERVER

BACKGROUND OF THE INVENTION

1. Technical Field

The present invention relates to a fixture for testing a mid-plane of a blade server, and particularly to a fixture with a simplified configuration and convenient usability.

2. Background

A blade server is newly developed based on the high speed of the network. The blade server comprises a carrier enclosure, a fixture unit, and a mid-plane. The carrier enclosure comprises a number of motherboards in shape of blade. The fixture unit includes a number of power suppliers, a number of administration modules, and a rear bracket. The mid-plane is a printed circuit board, which connects the carrier enclosure and the fixture unit. The function of the mid-plane reflects the ability of data inter-communication. Therefore, a mid-plane test is of great importance. The conventional process of mid-plane test is to draw out the power suppliers, the administration modules, and the rear bracket from the cabinet of the blade server at first. Then mount the mid-plane to be tested to the rear bracket, and install all the other modules to the cabinet to form an information handling system to test the function of the mid-plane. When test another mid-plane, the process cited above is executed again, and the new mid-plane is mounted on the blade server for testing. The conventional mid-plane testing process is complicated and time-consuming.

Thus, an improved fixture for testing a mid-plane of a blade server which overcomes the above-mentioned problems is desired.

SUMMARY

A fixture for testing a mid-plane of a blade server includes a base board, a fixture unit and a carrier enclosure. The fixture unit is fixed on the base board, the fixture unit includes a receiving location for mounting the mid-plane thereon. The carrier enclosure is slideably attached on the base board and docked with the mid-plane.

The fixture for testing a mid-plane of a blade server uses two separated modules to assist to test the mid-plane, there is no need to remove all modules from the blade server, whereupon simplifies the attachment and removing mid-plane procedure.

Other advantages and novel features will become more apparent from the following detailed description when taken in conjunction with the accompanying drawings, in which:

DETAILED DESCRIPTION OF THE EMBODIMENTS

Figure 1:
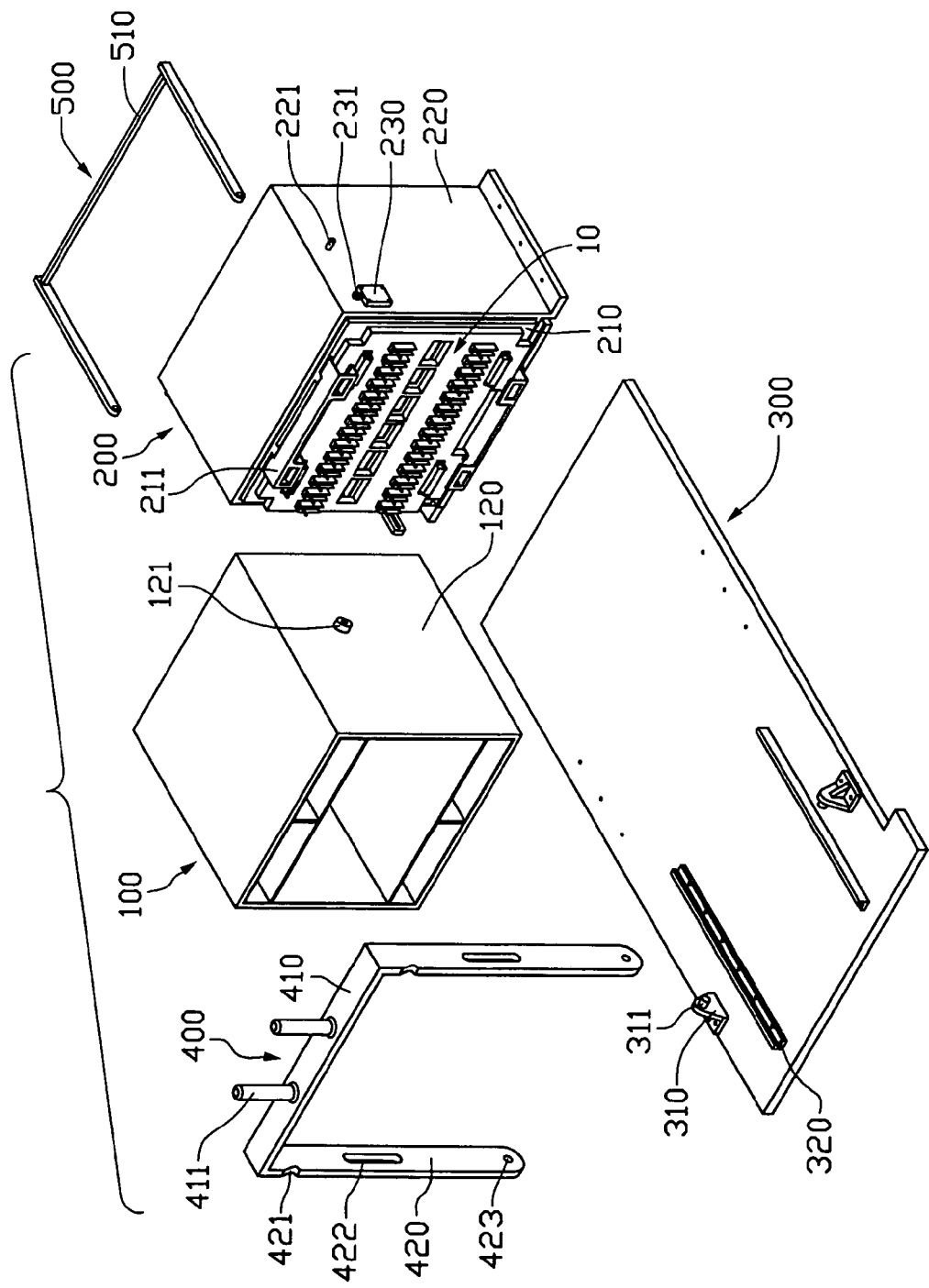
FIG. 1 is an exploded, isometric view of a fixture in accordance with the present invention.
Figure 2:
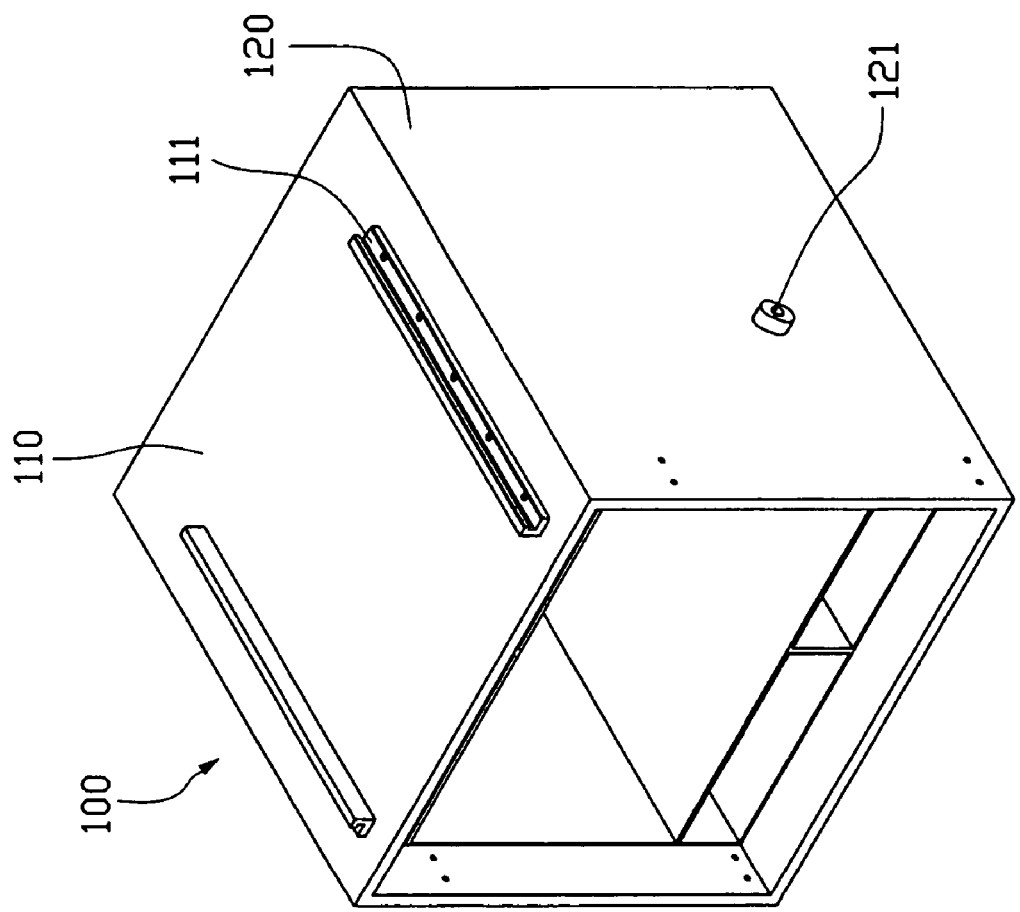
FIG. 2 is an inverted view of a carrier enclosure of the fixture of FIG. 1.

Referring to FIGS. 1 and 2, a fixture for testing a mid-plane of a blade server in accordance with a preferred embodiment of the present invention is shown. The fixture includes a carrier enclosure 100, a fixture unit 200, a base board 300, and a U-shaped handspike 400.

The carrier enclosure 100 is used for enclosing motherboards and cooling fans. The carrier enclosure 100 comprises a bottom plate 110, and two side plates 120 extending from opposite sides of the bottom plate 110. A sliding block 121 is formed outwardly from each side plate 120. A pair of sliding rails 111 is stamped outwardly on the bottom plate 110. Each sliding rail 111 has a U shape section.

The fixture module 200 is used for installing administration apparatus, connection apparatus, and a mid-plane. The fixture module 200 comprises a receiving location 210 for mounting a mid-plane thereon and two side walls 220. Two fasten members 211 are formed on the fixture module 200 at opposite sides of the receiving location 210 respectively. Two shafts 221 are respectively formed on the two sidewalls 220 for a locking unit 500 rotating thereof. A power protection switch 230 is attached on one of the two sidewalls 220 with a sensor 231 mounted thereon. The fixture for testing a mid-plane of a blade server is powered on when the sensor 231 is pressed down.

The base board 300 has two tabs 310 formed at opposite sides thereon. Each tab 311 comprises a post 311 stamped outwardly therefrom. A pair of guiding rails 320 is formed on the base board 300, corresponding to the sliding rails 111 of the carrier enclosure 100.

The handspike 400 comprises a crossbeam 410 and a pair of side arms 420 extending vertically from the crossbeam 410 respectively. Two handles 411 are formed on the crossbeam 410. A concave 421 is defined in a top edge of each of the two side arms 420. Each side arm 420 has a guiding slot 422 defined in a middle portion, and a through hole 423 defined in a bottom portion.

Figure 3:
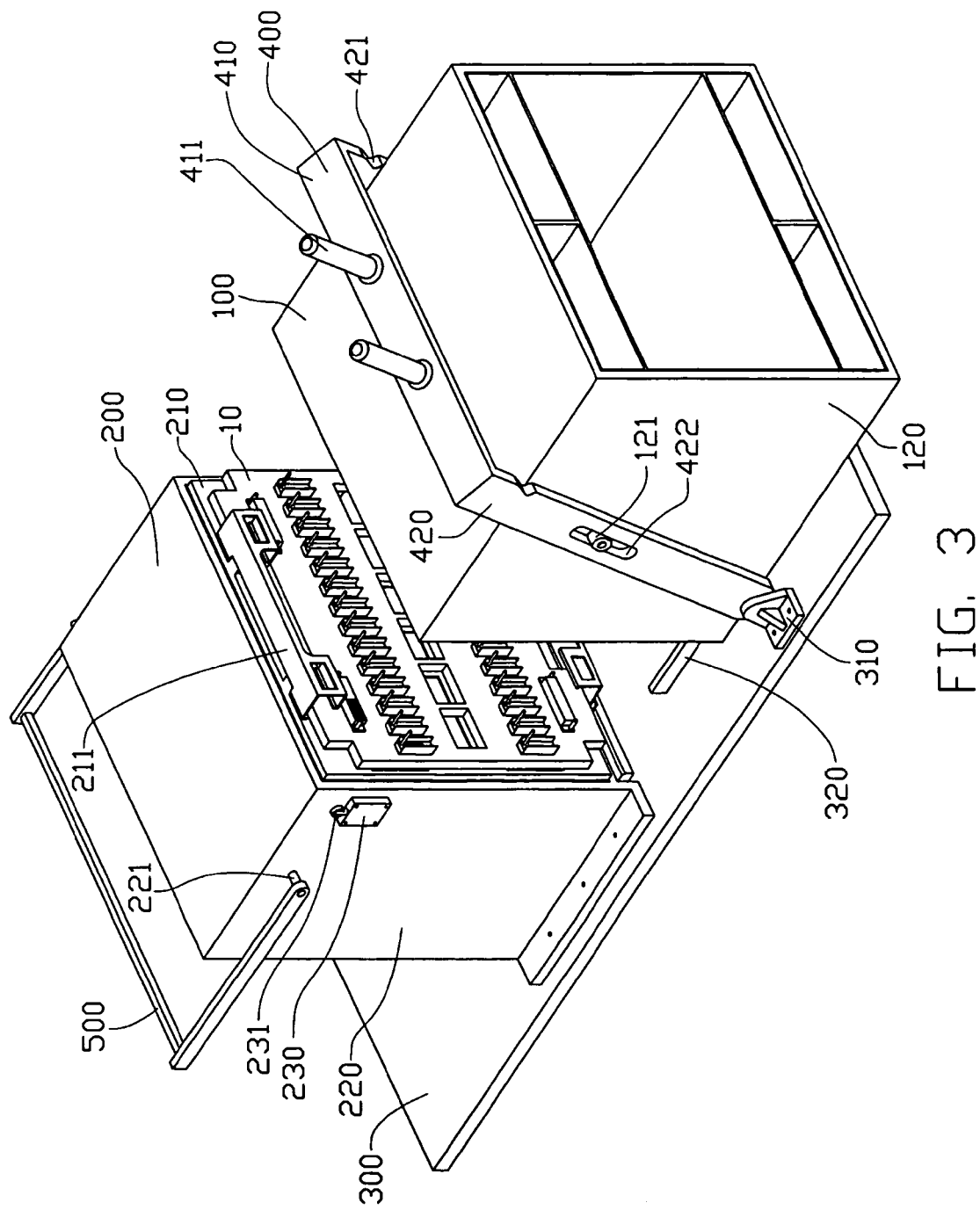
FIG. 3 is an assembled view of FIG. 1.

Referring also to FIG. 3, the carrier enclosure 100 is slidably mounted on the base board 300 by sliding the leader rails 111 along the guiding rails 320. The handspike 400 is attached to the carrier enclosure 100 with the slide blocks 121 received in the guiding slots 422, posts 311 of the tabs 310 are inserted into the through holes 423 of the handspike 400 respectively, such that the handspike 400 and the carrier enclosure 100 are combined together and rotatably attached to the base board 300.

The fixture unit 200 is fixed on the base board 300. A U-shaped locking member 500 is attached to the fixture unit 200 and rotated around the shafts 221 of the fixture unit 200. The locking unit 500 comprises a lever 510 thereon.

Figure 4:
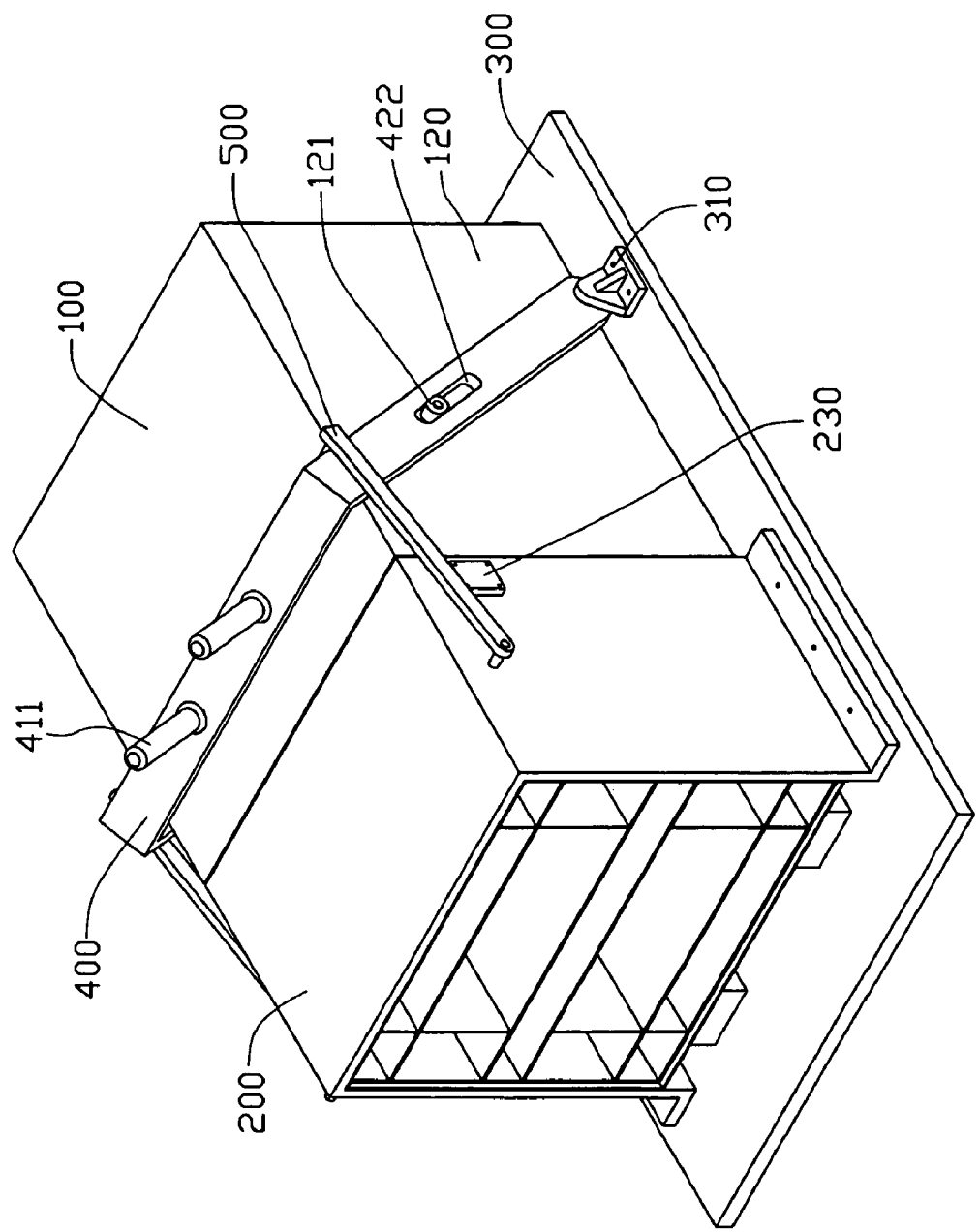
FIG. 4 is similar to FIG. 3, but showing the carrier enclosure, a mid-plane and a fixture unit mounting together.

Referring also to FIG. 4, in use, a mid-plane 10 to be tested is attached to the receiving location 210 of the fixture unit 200 and is fastened by the fasten member 211. The handles 411 of the handspike 400 is pushed toward the mid-plane 10, the handspike 400 is thereby rotated around the posts 311, the sliding blocks 121 move upwardly in the guiding slots 422 to drive the carrier enclosure 100 slide along the guiding rails 320 toward the fixture unit 200, so that the carrier enclosure 100 and the fixture unit 200 connect together through the mid-plane 10. The locking unit 500 is then rotated toward the handspike 400, the level 510 is engaged in the concave 421 of the handspike 400, the locking unit 500 presses the sensor 231 on the power protection switch 230 to turn on the fixture, then the mid-plane 10 is tested. After the testing is completed, the locking unit 500 is rotated in a reverse direction to disengage the locking unit 500 from the handspike 400, the handspike 400 is slide away from the fixture unit 200, then draw out the mid-plane 10 so that the mid-plane 10 is removed from the fixture unit 200.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fixture for testing a mid-plane of a blade server, the fixture comprising:
   a base board;
   a fixture unit fixed on the base board, the fixture unit comprising a receiving location mounting the mid-plane thereon;
   a carrier enclosure slidably attached on the base board and docked with the mid-plane; and
   a handspike pivotably attached to the base board and slidably engaging with the carrier enclosure to move the carrier enclosure away from the fixture unit so as to expose the mid-plane and move the carrier enclosure toward the fixture unit to communicate with the mid-plane;
   wherein the base board has two tabs formed at opposite sides thereon, the handspike is rotatably attached to the two tabs, the handspike comprises two side arms, each of the side arms has a guiding slot defined therein, the carrier enclosure comprises two side plates, and each of the side plates has a sliding block formed thereon which extends into the guiding slot.

2. The fixtures as claimed in claim 1, wherein the carrier enclosure comprises a bottom plate, the bottom plate has a pair of sliding rails, the base board has a pair of guiding rails corresponding to the sliding rails to slidably attach the carrier enclosure to the base board.

3. The fixtures as claimed in claim 1, wherein the fixture unit comprises two side walls, two shafts are respectively formed on the two sidewalls for a locking unit rotating thereto, the locking unit has a lever thereon, each of the side arms of the handspike comprises a concave defined therein for allowing the lever to engage therein.

4. The fixture as described in claim 3, wherein a power protection switch is attached on one of the two sidewalls with a sensor attached thereon.

5. The fixture as described in claim 1, wherein two fasten members are formed on the fixture unit and at opposite sides of the receiving location respectively.

6. A method for manufacturing a fixture for testing a mid-plane of a blade server, the method comprising:
   providing a base board;
   fixing a fixture unit on the base board, the fixture unit comprising a receiving location adapted for mounting the mid-plane on the fixture unit;
   providing a carrier enclosure slidably attached on the base board and docked with the mid-plane; and
   providing a handspike pivotably attached to the base board and slidably engaging with the carrier enclosure to move the carrier enclosure away from the fixture unit so as to expose the mid-plane and move the carrier enclosure toward the mid-plane to communicate with the mid-plane;
   wherein the base board has two tabs formed at opposite side thereon, the handspike is rotatably attached to the tabs, the handspike comprises two side arms, each of the side arms has a guiding slot defined therein, the carrier enclosure comprises two side plates, and each of the side plates has a sliding block formed thereon which extends into the guiding slot.

7. The method as claimed in claim 6, wherein the carrier enclosure comprises a bottom plate, the bottom plate has a pair of sliding rails, the base board has a pair of guiding rails corresponding with the sliding rails to slidably attach the carrier enclosure to the base board.

8. The method as claimed in claim 6, wherein the fixture unit comprises two side walls, two shafts are respectively formed on the two sidewalls for a locking unit rotating thereof, the locking unit has a lever thereon, each of the side arms of the handspike comprises a concave defined therein for allowing the lever to engage therein.

9. The method as described in claim 8, wherein a power protection switch is attached on one of the two sidewalls with a sensor attached thereon.

10. The method as described in claim 6, wherein two fastening members are formed on the fixture module at opposite sides of the receiving location respectively.

11. A server assembly comprising:
    a carrier enclosure enclosing a first part of said server assembly to be modularized therewith;
    a fixture unit enclosing a second part of said server assembly to be modularized therewith and installable next to said carrier enclosure so as to form said server assembly together with said carrier enclosure when said fixture unit abuts against said carrier enclosure;
    a mid-plane physically installable between said first part and said second part of said server assembly so as to provide electrical communication between said first part and said second part of said server assembly, said mid-plane being shielded by both of said carrier enclosure and said fixture unit when said fixture unit abuts against said carrier enclosure; and
    operating means pivotably attached to said fixture unit and slidably engaging with said carrier enclosure to guidably and slidably move said carrier enclosure away from said fixture unit so as to expose said mid-plane to an outside of said server assembly, a guiding slot selectively defined in the operating means and said carrier enclosure, a sliding block selectively extending from the operating means and said carrier enclosure to be slidably received in the guiding slot;
    wherein said operating means comprises a handspike formed on said carrier enclosure and operable to drive movement of said carrier enclosure away from said fixture unit, said fixture unit comprises a pair of tabs respectively extending therefrom to pivotably attach the handspike thereto, the handspike comprises two side arms, each of the side arms comprises the guiding slot defined therein, the carrier enclosure comprises two side plates, and each of the side plates comprises the sliding block formed thereon slidably extend into the guiding slot.

12. The server assembly as described in claim 11, wherein said carrier enclosure and said fixture unit are attachably installable to a base board respectively, the base board comprises a pair of guiding rails to slidably attached the carrier enclosure thereon, the fixing unit is fixed on the base board beside ends of the guiding rails.

13. The server assembly as described in claim 11, wherein a locking unit is formed on said fixture unit in order to confine said handspike when said fixture unit abuts against said carrier enclosure, the fixture unit comprises two side walls, two shafts are respectively formed on the two sidewalls for a locking unit rotating thereto, the locking unit has a lever thereon, each of the side arms of the handspike comprises a concave defined therein, when the handspike and locking unit are pivoted to each other, the locking unit passes over the top of the handspike and engages in the concaves.

14. The fixtures as claimed in claim 1, wherein the base board comprises at least one tab extending from one side thereof, the handspike is pivotably attached to the at least one tab, the handspike comprises at least one side arm, the at least one side arm comprises a guiding slot defined therein, the carrier enclosure comprises at least one side plate, the at least one side plate comprises a sliding block formed thereon which extends into the at least one guiding slot.

* * * * *